(12) United States Patent
Nagaya et al.

(10) Patent No.: US 8,425,161 B2
(45) Date of Patent: Apr. 23, 2013

(54) CUTTING TOOL WITH DETACHABLE INSERT, HEAD MEMBER AND TOOL BODY OF THE SAME

(75) Inventors: Hidehiko Nagaya, Hoffman Estates, IL (US); Norio Aso, Sashima-gun (JP); Yasuharu Imai, Shimotsuma (JP)

(73) Assignee: Mitsubishi Materials Corporation, Tokyo (JP)

( * ) Notice: Subject to any disclaimer, the term of this patent is extended or adjusted under 35 U.S.C. 154(b) by 457 days.

(21) Appl. No.: 12/734,353

(22) PCT Filed: Oct. 28, 2008

(86) PCT No.: PCT/JP2008/069544
§ 371 (c)(1),
(2), (4) Date: Jun. 29, 2010

(87) PCT Pub. No.: WO2009/057590
PCT Pub. Date: May 7, 2009

(65) Prior Publication Data
US 2010/0272523 A1 Oct. 28, 2010

(30) Foreign Application Priority Data
Oct. 30, 2007 (JP) .................. 2007-282119

(51) Int. Cl.
*B23B 27/08* (2006.01)
*B23B 29/04* (2006.01)
(52) U.S. Cl.
USPC .......................................................... 407/107
(58) Field of Classification Search .......... 407/107, 407/109, 101, 110, 108, 111
See application file for complete search history.

(56) References Cited

U.S. PATENT DOCUMENTS 3,372,451 A * 3/1968 Pinder et al. ............ 407/109
3,376,763 A * 4/1968 Welles ..................... 408/199
(Continued)

FOREIGN PATENT DOCUMENTS

CH         692449 A5     6/2002
DE         4028361        3/1991
(Continued)

OTHER PUBLICATIONS

Supplementary European Search Report dated Feb. 27, 2012, issued for the corresponding European patent application No. 08843766.0.
(Continued)

*Primary Examiner* — Will Fridie, Jr.
(74) *Attorney, Agent, or Firm* — Edwards Wildman Palmer LLP

(57) ABSTRACT

In a head member (30) for a cutting tool with detachable insert (70) including a head member body (31) formed with an insert attachment seat (36) to which a cutting insert (50) having cutting blades (52) is detachably attached, and constituting the cutting tool with detachable insert (70) by being mounted to a tip portion of a holder (10), a side surface (31A) of the head member body (31) is formed with a recess (44) which has a continuous inner wall surface therearound and a bottom surface connected to the inner wall surface over its whole periphery and which is recessed from the side surface (31A) without passing though the head member body (31). According to this head member (30), generation of chatter vibration can be suppressed even if the amount of protrusion is increased, and the cutting heat of a cutting insert can be efficiently radiated.

15 Claims, 8 Drawing Sheets

U.S. PATENT DOCUMENTS

| | | | |
|---|---|---|---|
| 4,992,007 | A | 2/1991 | Satran |
| 5,112,164 | A | 5/1992 | Pano |
| 5,288,180 | A | 2/1994 | Hedlund |
| 5,709,508 | A | 1/1998 | Barazani et al. |
| 5,833,403 | A * | 11/1998 | Barazani ............... 407/101 |
| 5,873,682 | A * | 2/1999 | Tripsa ............... 407/101 |
| 6,186,704 | B1 | 2/2001 | Hale |
| 6,270,293 | B2 * | 8/2001 | Erickson et al. ........... 407/101 |
| 7,246,974 | B2 | 7/2007 | Hansson et al. |
| 7,758,286 | B2 | 7/2010 | Nagaya et al. |
| 7,780,380 | B2 | 8/2010 | Nagaya et al. |
| 8,277,150 | B2 * | 10/2012 | Watanabe et al. ........... 407/11 |
| 2004/0247404 | A1 | 12/2004 | Oettle |
| 2005/0129471 | A1 | 6/2005 | Englund |
| 2007/0207671 | A1 | 9/2007 | Nagaya et al. |

FOREIGN PATENT DOCUMENTS

| | | |
|---|---|---|
| DE | 102005038828 | 2/2007 |
| EP | 0526438 A2 | 2/1993 |
| EP | 1829636 | 9/2007 |
| JP | 01-115504 A | 5/1989 |
| JP | 5-56305 U | 7/1993 |
| JP | 05-192802 A | 8/1993 |
| JP | 08-215904 A | 8/1996 |
| JP | 2001-062610 A | 3/2001 |
| JP | 2004-202631 A | 7/2004 |
| JP | 2005-118992 A | 5/2005 |
| JP | 2007-260892 A | 10/2007 |
| JP | 2009-107071 A | 5/2009 |
| WO | WO-00/51768 | 9/2000 |
| WO | WO-2007/019892 A1 | 2/2007 |

OTHER PUBLICATIONS

Office Action issued on Oct. 26, 2012 for U.S. Appl. No. 12/734,352.
Notice of Allowance mailed Sep. 18, 2012, issued for the Japanese Patent Application No. 2007-282119 and English translation thereof.
Supplementary European Search Report dated Mar. 30, 2011, issued for the European patent application No. 08845496.2.
International Search Report dated Dec. 2, 2008, issued on PCT/JP2008/069561 with English translation thereof.
International Search Report dated Dec. 2, 2008, issued on PCT/JP2008/069544.
Notice of Reasons for Rejection mailed Jun. 12, 2012, issued for the Japanese Patent Application No. 2007-282119 and English translation thereof.

* cited by examiner

CUTTING TOOL WITH DETACHABLE INSERT, HEAD MEMBER AND TOOL BODY OF THE SAME

CROSS REFERENCE TO RELATED APPLICATIONS

This application is related to co-pending application: "CUTTING TOOL WITH DETACHABLE INSERT, HEAD MEMBER AND TOOL BODY OF THE SAME" filed even date herewith in the names of Hidehiko Nagaya, Norio Aso and Yasuharu IMAI as a national phase entry of PCT/JP2008/069561, which application is assigned to the assignee of the present application and is incorporated by reference herein.

TECHNICAL FIELD

The present invention relates to a head member for a cutting tool with detachable insert which is formed with an insert attachment seat to which a cutting insert having cutting blades is detachably attached and which constitutes the cutting tool with detachable insert by being mounted on a tip portion of a holder, a tool body on which the head member is mounted on the tip portion of the holder. and a cutting tool with detachable insert which is used for grooving or cutting-off of a work material and in which an insert is clamped by the head member attached to the tip portion of the holder.

Priority is claimed on Japanese Patent Application No. 2007-282119, filed Oct. 30, 2007, the content of which is incorporated herein by reference.

BACKGROUND ART

As a cutting tool with detachable insert used for grooving or cutting-off of a work material, there is a tool having the following structure. In this tool, a pair of jaw portions is formed in an elastic deformable manner at the tip of a holder. A pressing surface is provided in one jaw portion of the pair of jaw portions. A pedestal surface is provided in the other jaw portion of the pair of jaw portions. The pressing surface and the pedestal surface are arranged so as to face each other. An insert attachment seat which clamps and attaches a cutting insert having cutting blades are formed by the pressing surface and the pedestal surface. In Patent Document 1, a cutting tool with detachable insert in which this insert attachment seat is formed in a head member detachably mounted on the tip portion of the holder is suggested.

[Patent Document 1] Japanese Patent Unexamined Publication No. 05-192802

DISCLOSURE OF INVENTION

Technical Problem

Especially in this kind of cutting tool with detachable insert used for grooving or cutting-off, in order to secure the amount of protrusion of cutting blades of a cutting insert from the holder to be as large as possible, even in the head member, it is required to increase the amount of protrusion from the portion mounted on the mounting portion of the holder to the portion formed with the insert attachment seat by the pair of jaw portions. However, when the load during cutting acts on the cutting insert attached to the portion which protrudes in this way, vibration is apt to be generated in the head member, this vibration propagates to the holder and becomes so-called chatter vibration. As a result, machining accuracy may be impaired, or smooth machining operation may be hindered.

If the amount of protrusion of the attachment portion becomes large in this way, and the mass of the head member increases, a tip portion of the holder becomes heavy in the cutting tool with detachable insert. Therefore, when vibration is generated, the vibration is hardly attenuated, and generation of chatter vibration is more readily caused. Moreover, in recent years, cutting under dry conditions is often required due to environmental considerations. In such a case, it is necessary to rapidly disperse the cutting heat generated in the cutting insert.

The present invention was made under such a background, and the object of the present invention is to provide a head member for a cutting tool with detachable insert capable of suppressing the generation of chatter vibration even if the amount of protrusion from a portion mounted on a mounting portion of a holder to a portion formed with an insert attachment seat is increased, and capable of efficiently radiating the cutting heat of a cutting insert, especially in the head member for a cutting tool with detachable insert used for grooving or cutting-off, a tool body in which the head member is mounted on a tip portion of the holder, and a cutting tool with detachable insert in which an insert is clamped by the head member attached to the tip portion of the holder.

Technical Solution

The present invention relates to a head member for a cutting tool with detachable insert including a head member body formed with an insert attachment seat to which a cutting insert having cutting blades is detachably attached, and constituting the cutting tool with detachable insert by being mounted to a tip portion of a holder. A side surface of the head member body is formed with a recess which has a continuous inner wall surface therearound and a bottom surface connected to the inner wall surface over its whole periphery and which is recessed from the side surface without passing though the head member body. The present invention relates also to a tool body to which such a head member is mounted on the tip portion of the holder, and a cutting tool with detachable insert used in which an insert is clamped by the head member attached to the tip portion of the holder.

In the head member having the above construction, a side surface of a head member body of the head member is formed with a recess. Therefore, in this side surface, in between a peripheral surface portion of the head member body connected to the side surface and the inner wall surface portion of the recess which faces opposite to the peripheral surface portion, or in a case where a plurality of recesses are formed in one side surface, in between the inner wall surfaces of the portion adjacent to the recesses, at least two rib-like portions which protrude with respect to the bottom surface are formed for each side surface. Accordingly, the vibration generated as cutting load acting on the cutting insert is dispersed via the rib-like portions and propagates to the holder. As a result, it is possible to suppress chatter vibration of the holder.

Since the weight reduction of the head member body can be achieved by forming the recess in this way, the generated vibration itself can be easily attenuated. On the other hand, even if weight reduction is achieved in this way, the above-described rib-like portions are formed on the head member body, and thus the strength thereof does not degrade more than needed. Moreover, since the surface area of the head member body is increased by forming the recess, the cutting heat generated in the cutting insert can also be rapidly radiated via the head member body.

Here, in the above head member, the head member body has the front and rear side surfaces which mutually face opposite sides, and the recesses are respectively formed in each side face in mutually different shapes when seen from directions facing the each side surface. As a result, at least two rib-like portions are formed on both the side surfaces, and the shapes thereof are made different. Hence, the vibration generated in the cutting insert can be more reliably dispersed during propagation, the vibrations which propagate can be mutually cancelled, and the generation of the chatter vibration in the holder can be effectively suppressed.

By forming the head member body with a plurality of the recesses with different depths from the side surface as well, a plurality of rib-like portions with different protrusion heights from the bottom surfaces of the recesses is formed in the head member body. As a result, the vibration can be mutually cancelled by the rib-like portions. In addition, the plurality of recesses with different depths may be formed in one side surface of the head member body, and may be formed in the front and back side surfaces as described above.

In addition, if the total volume of the recesses formed in this way is too large, the strength degradation of the head member body is not avoided even if the rib-like portions are somehow formed. On the other hand, if the total volume is too small, the possibility that the above-described effect cannot be reliably exhibited occurs. For this reason, it is preferable that the total volume of the recesses be set to a range of 2% to 15% of the volume of the head member body in which the recesses are not formed.

In particular, in order to prevent the strength degradation of the head member body caused by forming such recesses, it is preferable to perform shot peening on the head member body. This enables compressive stress to remain on the surface of the head member body, thereby securing strength.

Advantageous Effects

As described above, according to the present invention, even if the amount of protrusion from a portion mounted on the mounting portion of the holder to a portion formed with the insert attachment seat, it is possible to dampen the vibration propagating from the cutting insert to the holder during cutting, thereby preventing chatter vibration, from being generated in the holder. Since the vibration itself of the head member body is easily attenuated by the weight reduction, stable and smooth cutting can be achieved with high-precision. Additionally, it is possible to rapidly radiate the heat generated in the cutting insert, thereby preventing thermal damage from occurring in the cutting insert, or temperature adhesion of chips from occurring in the cutting insert, even in dry cutting.

EXPLANATION OF REFERENCE

Figure 1:
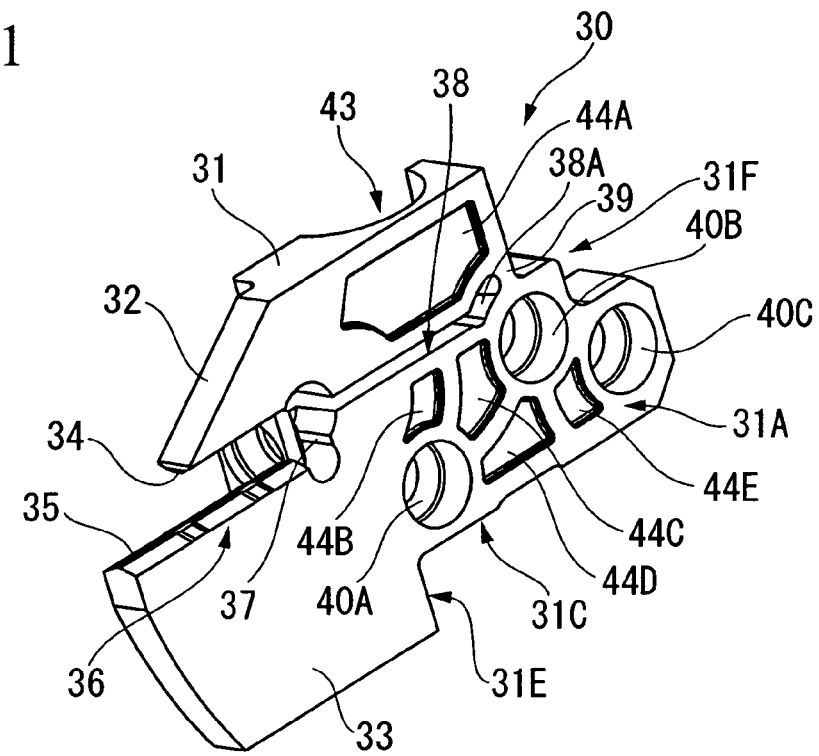
FIG. 1 is a perspective view when a head member of one embodiment of the present invention is seen from the upside of the tip and one side surface of a head member body.
Figure 2:
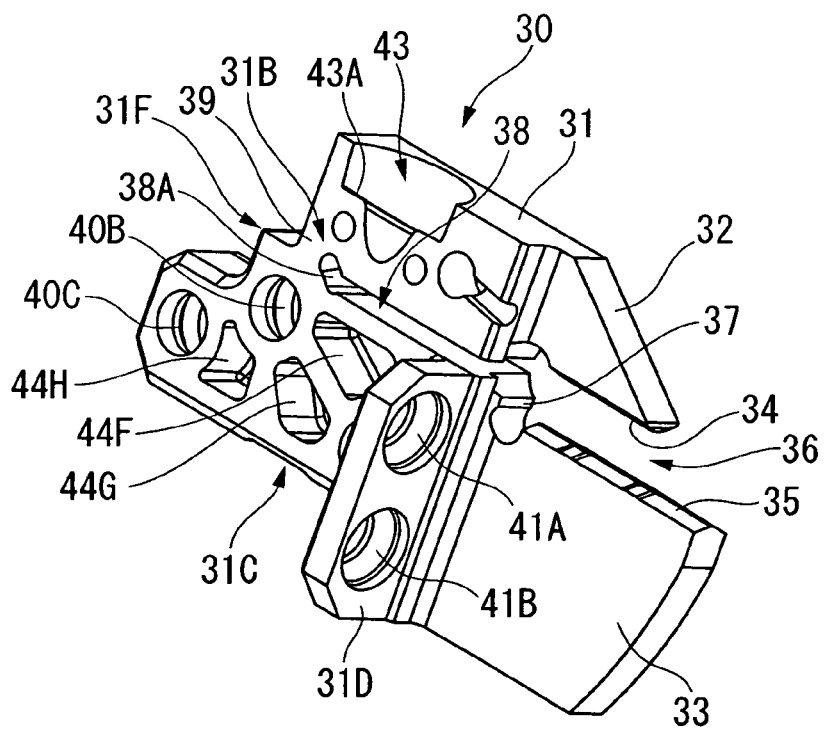
FIG. 2 is a perspective view when the embodiment shown in FIG. 1 is seen from the upside of the tip and the other side surface of the head member body.
Figure 3:
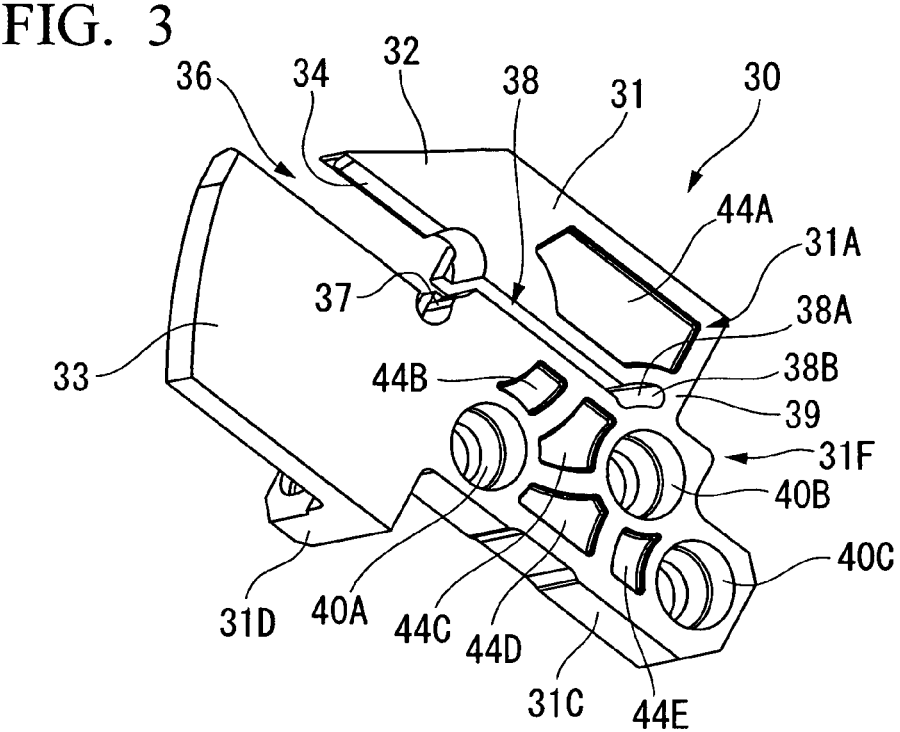
FIG. 3 is a perspective view when the embodiment shown in FIG. 1 is seen from the downside of the tip and the one side surface A.
Figure 4:
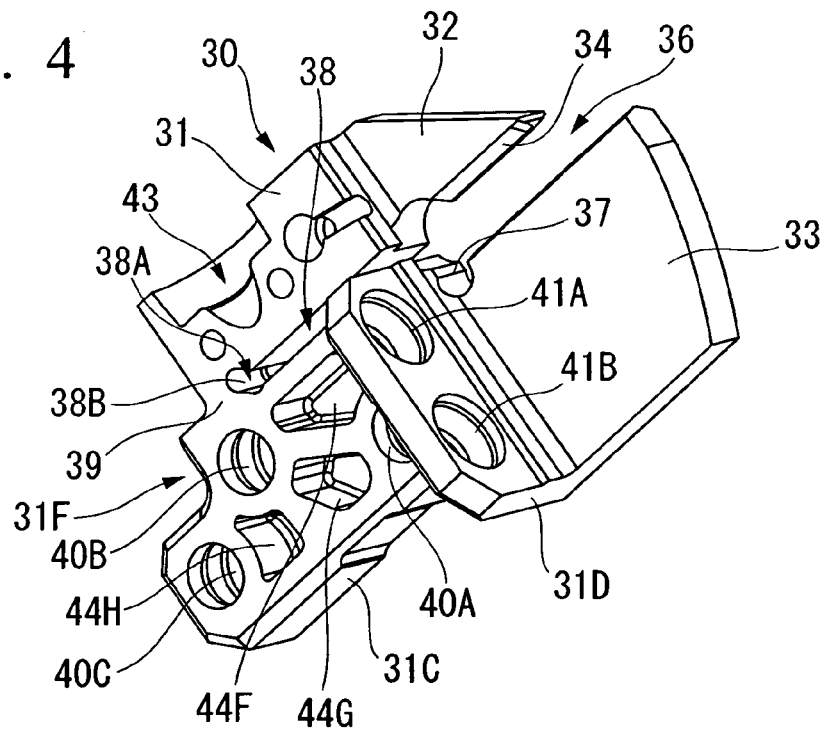
FIG. 4 is a perspective view when the embodiment shown in FIG. 1 is seen from the downside of the tip and the other side surface.

10: HOLDER
16: MOUNTING PORTION
22: CLAMP SCREW HOLE
30: HEAD MEMBER
31: HEAD MEMBER BODY
31A: ONE SIDE SURFACE OF HEAD MEMBER BODY 31
31B: THE OTHER SIDE SURFACE OF HEAD MEMBER BODY 31
31F: REAR END SURFACE OF HEAD MEMBER BODY 31
32: UPPER JAW PORTION
33: LOWER JAW PORTION
34: PRESSING SURFACE
35: PEDESTAL SURFACE
36: INSERT ATTACHMENT SEAT
38: SLIT
38A: BENT PORTION
38B: REAR WALL SURFACE OF BENT PORTION 38A
39: CONNECTING PORTION
40A TO 40C: FIRST INSERTION HOLE
42: FIXING SCREW
43: COUNTERSUNK PORTION
44 (44A TO 44H): RECESS
45: INNER WALL SURFACE OF RECESS 44
46: BOTTOM SURFACE OF RECESS 44
47: CLAMP SCREW
50: CUTTING INSERT
51: INSERT BODY
52: CUTTING BLADE
60: TOOL BODY
70: CUTTING TOOL WITH DETACHABLE INSERT
O: AXIS OF HOLDER 10

θ: INCLINATION ANGLE BETWEEN REAR WALL SURFACE 38B AND REAR END SURFACE 31F

BEST MODE FOR CARRYING OUT THE INVENTION

FIGS. 1 to 12 show one embodiment of a head member of the present invention, and FIGS. 13 to 16 show one embodiment for a cutting tool with detachable insert of the present invention on which the head member of the present embodiment is mounted. The cutting tool with detachable insert 70 of the present embodiment is a turning tool (cutting tool) with detachable insert which performs grooving or cutting-off on a rotating work material, and includes a substantially quadrangular prismatic holder 10 which is held by a tool rest of a machine tool, a head member 30 of the above embodiment which is mounted on the tip of the holder 10, and a cutting insert 50 which is clamped by the head member 30. Additionally, a tool body 60 is formed from the holder 10, and the head member 30 which is mounted at a tip portion of the holder 10.

The holder 10 is formed of steel and has a substantially square prismatic shape having an upper surface 11 and a lower surface 12 which face each other, and a pair of side surfaces 13A and 13B, and the rear end side (the upper right side in FIGS. 13 and 15, and the upper left side in FIGS. 14 and 16) of the holder is formed as a shank portion 14 which extends along an axis O of the square prism. Additionally, the tip side (the lower left side in FIGS. 13 and 15, and the lower right side in FIGS. 14 and 16) of the holder 10 is formed with a protruding portion 15 which protrudes towards the upside from the upper surface 11 of the holder 10, and the tip portion of the holder 10 formed with the protruding portion 15 is provided with a mounting portion 16 for mounting the head member 30.

The mounting portion 16 is formed in a concave shape so that the tip surface of the holder 10 and the part of the tip portion on the side of one side surface 13A are cut out. Additionally, the mounting portion 16 includes a first receiving surface 17 which has a planar shape which extends parallel to the one side surface 13A of the holder 10, a second receiving surface 18 which has a planar shape which extends in a direction orthogonal to the first receiving surface 17 and is orthogonal to the axis O and which faces the tip side of the holder 10, and a third receiving surface 19 which has an upward planar shape which extends in a direction orthogonal to the first and second receiving surfaces 17 and 18.

Figure 13:
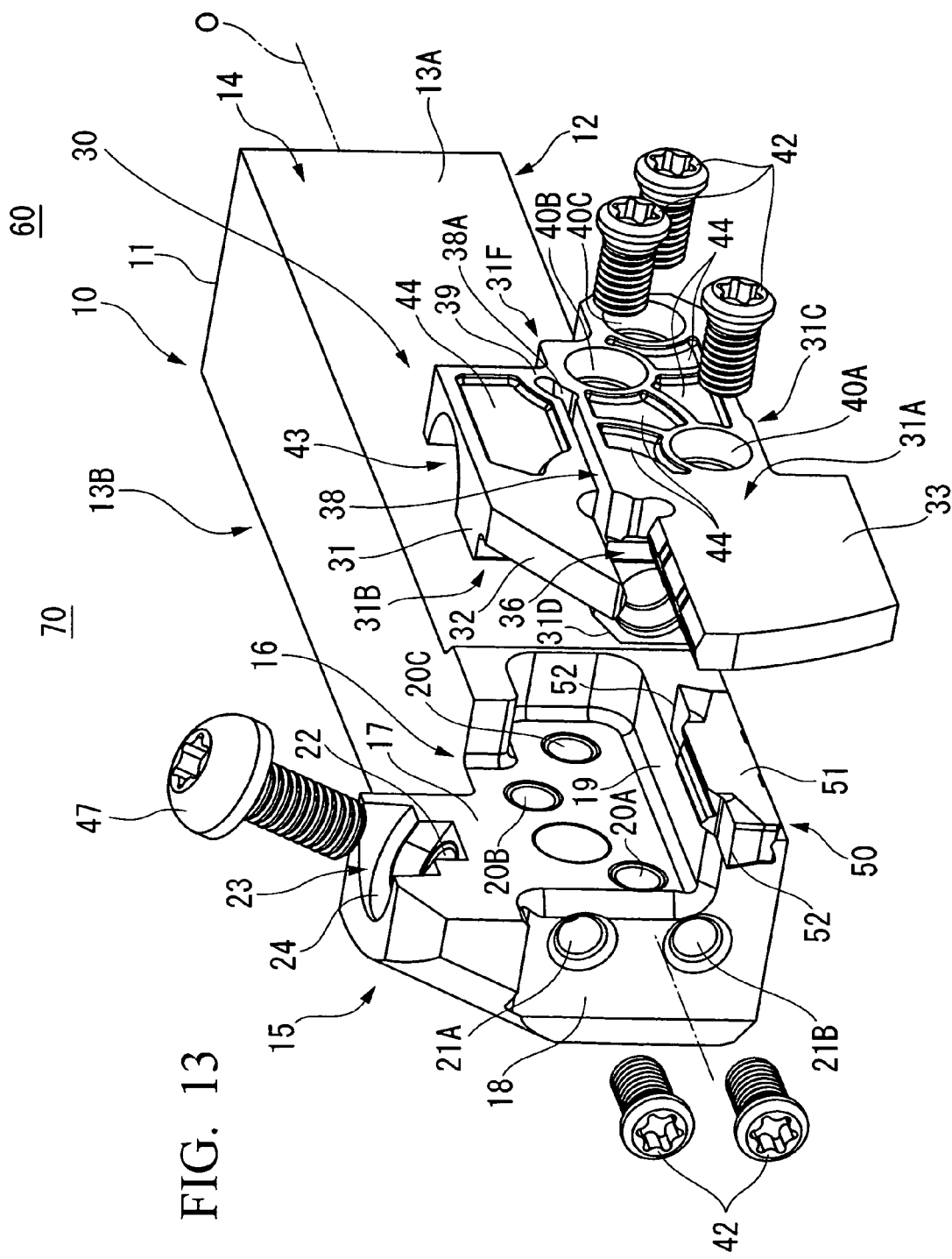
FIG. 13 is an exploded perspective view when a cutting tool with detachable insert of one embodiment of the present invention on which the head member shown in FIG. 1 is mounted is seen from the upside of the tip and one side surface of a holder.

Among the surfaces, the first receiving surface 17 is formed so as to be recessed from the one side surface 13A towards the other side surface 13B and extend up to the upper end of the protruding portion 15. Also, in the first receiving surface 17, three first fixing screw holes 20A to 20C are bored in the direction orthogonal to the first receiving surface 17 in the present embodiment. The first fixing screw holes 20A to 20C are formed so as to be lined up with each other in the direction of the axis O or be lined up in the front-back direction of the holder 10, and so as to open at the positions of respective apexes of a scalene triangle which is flat up and down and becomes upwardly convex as shown in FIG. 13.

Additionally, the second receiving surface 18 is arranged on the tip side in the direction of the axis O of the first receiving surface 17 in the orthogonal direction via a chamfered portion, and is formed so as to be recessed further towards the rear end side than the tip surface of the protruding portion 15, and have an L-shape as seen from the tip side. Two second fixing screw holes 21A and 21B bored in a direction orthogonal to the second receiving surface 18 are also opened in the second receiving surface 18 so as to be lined up in a direction which extends parallel to the first receiving surface 17 and orthogonal to the axis O, or be lined up in a perpendicular direction of the holder 10 in the present embodiment.

Moreover, the third receiving surface 19 is arranged between the first receiving surface 17 recessed towards the other side surface 13B, and the side surface of the tip portion of the holder 10 which faces the one side surface 13A, and is formed so as to extend orthogonal to the first receiving surface 17 and extend parallel to the axis O. Additionally, the third receiving surface 19 extends in the direction orthogonal to the second receiving surface 18 on the tip side thereof via a chamfered portion. In addition, in the mounting portion 16 which has a recessed shape, the rear end portion thereof is formed in a U-shape so as to opened towards the tip side as seen from the direction which faces the one side surface 13A, the first and third receiving surfaces 17 and 19 extend up to the rear end portion, and the first fixing screw hole 20C of the first fixing screw holes 20A to 20C at the rearmost end is bored in the rear end portion.

Additionally, the first fixing screw hole 20A of the first fixing screw holes 20A to 20C at the foremost end, and the second fixing screw holes 21A and 21B are arranged at mutually different positions in the direction which is orthogonal to the axis O and extend parallel to the first receiving surface 17, or in the perpendicular direction in the present embodiment. In the present embodiment, as shown in FIG. 13, the first fixing screw hole 20A on the tip side is arranged between the two second fixing screw holes 21A and 21B which are arranged up and down.

Additionally, a clamp screw hole 22, which inclines so as to be separated at a predetermined angle from the first receiving surface 17 as it moves downward in a plane orthogonal to the axis O towards the downside from the upper end of the protruding end is bored in the protruding portion 15. A stepped recess 23 which is opened more largely than the clamp screw hole 22 is formed around an upper end opening of the clamp screw hole 22, and the portion of the recess 23 on the one side surface 13A intersects the upper end of the first receiving surface 17, and is opened to the first receiving surface 17. Moreover, a stepped surface 24 of the recess 23 is made perpendicular to the centerline of the clamp screw hole 22, and is inclined at an obtuse angle with respect to the first receiving surface 17 so as to retreat gradually downward as it moves towards the one side surface 13A.

Figure 6:
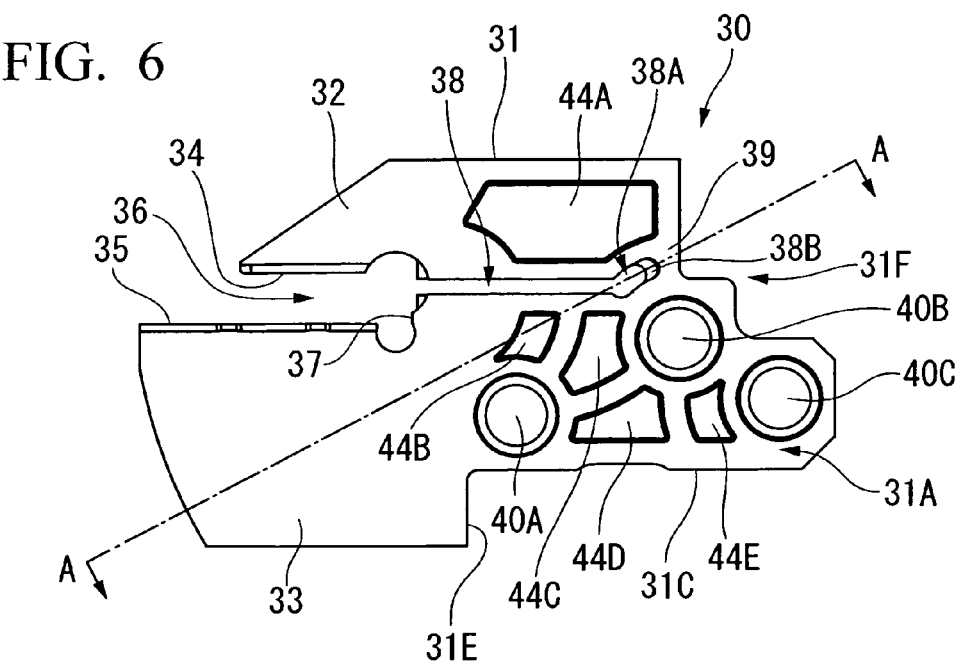
FIG. 6 is a side view when the embodiment shown in FIG. 1 is seen from the one side surface.
Figure 7:
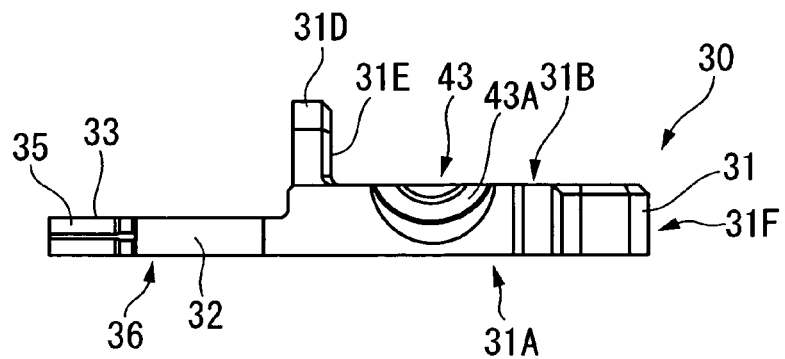
FIG. 7 is a plan view (top view) when the embodiment shown in FIG. 1 is seen from the upper surface.
Figure 8:
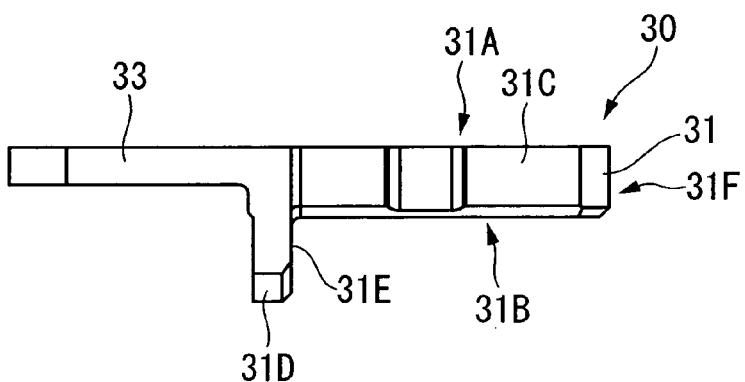
FIG. 8 is a bottom view (bottom view) when the embodiment shown in FIG. 1 is seen from the lower end surface.

The head member 30 of the present embodiment which is mounted on the mounting portion 16 of such a holder 10 is constituted by a head member body 31 which is also integrally formed of steel. The head member body 31 is formed substantially in the shape of a multi-stage flat plate in which a rear end portion (a right portion in FIGS. 6 to 9) thereof is thicker than a tip portion (a left portion in FIGS. 6 to 9) thereof by one step as shown in FIGS. 7 and 8.

In this rear end portion, one side surface (a lower side surface in FIG. 7 and an upper side surface in FIG. 8) 31A of the head member body 31 which faces the one side surface 13A of the holder 10 in an attached state of being attached to the holder 10, and the other side surface (an upper side surface in FIG. 7 and a lower side surface in FIG. 8) 31B opposite to the one side surface 31A are arranged in parallel. Here, in the head member body 31, as seen from above and below in the attached state as shown in FIGS. 7 and 8, one side surface 31A is formed in a planar shape along the direction (front-back direction) of the axis O, and the rear end portion of the other side surface 31B protrudes towards the other side surface 13B of the holder 10 by one step with respect to the tip portion.

Figure 5:
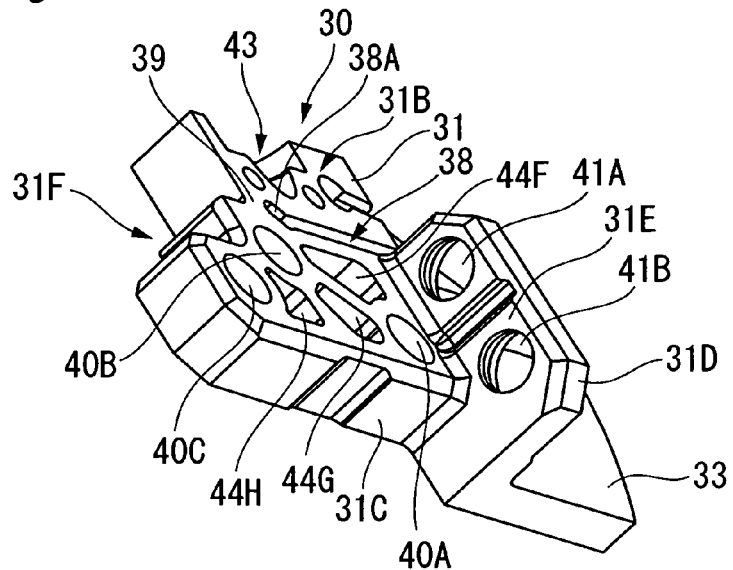
FIG. 5 is a perspective view when the embodiment shown in FIG. 1 is seen from the downside of the rear end and the other side surface.
Figure 11:
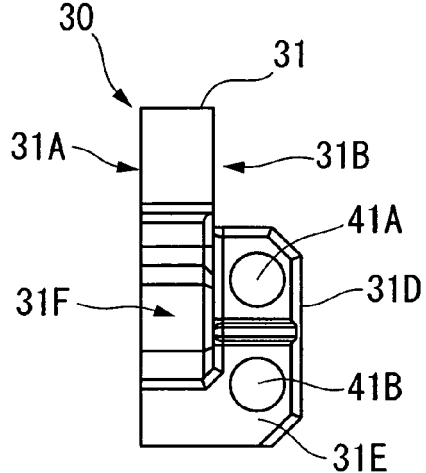
FIG. 11 is a rear view when the embodiment shown in FIG. 1 is seen from the rear end surface.

Additionally, a protruding wall portion 31D, which has an L-shaped flat plate shape as shown in FIGS. 5 and 11, is also formed integrally with the head member body 31 from a tip edge of a rear end portion of the protruding other side surface 31B to a lower end surface 31C of the rear end portion, and a back surface 31E which faces the rear end side of the protruding wall portion 31D extends in a direction perpendicular to the axis O in the attached state. In addition, the other side surface 31B at the rear end portion of the head member body 31 except for the protruding wall portion 31D is formed in a planar shape when seen from above and below as described above.

Figure 10:
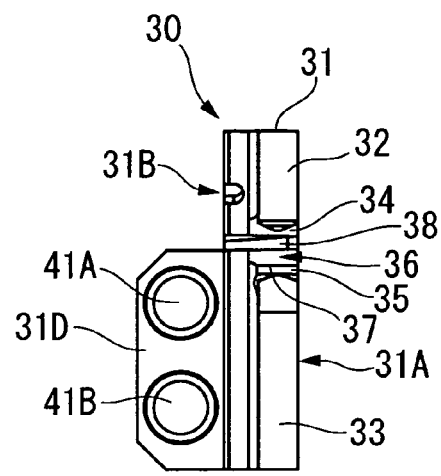
FIG. 10 is a front view when the embodiment shown in FIG. 1 is seen from the tip side.

On the other hand, the tip portion of the head member body 31 which is made thinner by one step than the rear end portion is formed with a pair of jaw portions (an upper jaw portion 32 and a lower jaw portion 33) which extends towards the tip side along the one side surface 13A of the holder 10 in the attached state. Among the jaw portions, the upper jaw portion 32 is provided with a pressing surface 34 which presses the insert 50 which will be described later from above, and the lower jaw portion 33 is provided with a pedestal surface 35 which is arranged to face the pressing surface 34. Also, in the present embodiment, an insert attachment seat 36 which has a recessed shape opened towards the tip side as shown in FIG. 6 is formed by the pressing surface 34 and the pedestal surface 35. In addition, when seen from the tip side as shown in FIG. 10, the pedestal surface 35 has an inverted convex V-shape which becomes convex towards the upside, and the pressing surface 34 has a convex V-shape which becomes convex towards the downside.

Moreover, a contacting surface 37 which faces the tip side perpendicularly to the axis O in the attached state is formed on the side of pedestal surface 35, deep in the insert attachment seat 36 or on the rear end side between the pressing surfaces 34 and the pedestal surface 35. Additionally, from between the contacting surface 37 and the pressing surface 34, a slit 38, which passes through between the side surfaces 31A and 31B of the rear end portion of the head member body 31 perpendicularly to the side surfaces 31A and 31B, and further extends towards the rear end side parallel to the axis O, is formed. The upper jaw portion 32 is elastically deformable so as to deflect toward the lower jaw portion 33 as a connecting portion 39 with the lower jaw portion 33 at the rear end of the slit 38 is a fulcrum.

Figure 9:
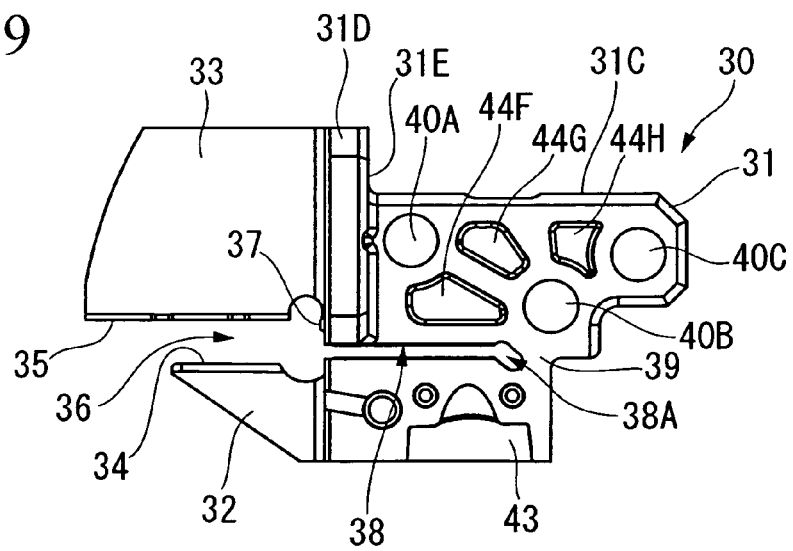
FIG. 9 is a side view when the embodiment shown in FIG. 1 is seen from the other side surface.

Furthermore, as shown in FIGS. 6 and 9, the lower jaw portion 33 is made continuous with a protruding wall portion 31D so as to protrude further towards the tip side than the upper jaw portion 32 and protrude further downward than the lower end surface 31C at the rear end portion of the head member body 31 and thereby have a lower surface flush with the protruding wall portion 31D. In addition, the lower end surface 31C at the rear end portion is formed in a planar shape perpendicular to the side surfaces 31A and 31B, and extends parallel to the axis O in the attached state. It is noted herein that a shallow recess is formed in a substantially middle portion in the extension direction.

Such a head member 30 is seated so that the rear end portion of the head member body 31 is charged into the recessed mounting portion 16 at the tip of the holder 10, the other side surface 31B at the rear end portion is brought into close contact with the first receiving surface 17 of the mounting portion 16, the back surface 31E of the protruding wall portion 31D is brought into close contact with the second receiving surface 18, and the lower end surface 31C at the rear end portion is brought into close contact with the third receiving surface 19. Here, three first insertion holes 40A to 40C and two second insertion holes 41A and 41B are formed at positions corresponding to the first fixing screw holes 20A to 20C and the second fixing screw holes 21A and 21B in a state where the head member 30 is seated in this way, in the rear end portion of the head member body 31, and the protruding wall portion 31D.

The first and second insertion holes 40A to 40C, and 41A and 41B have a circular cross-section, respectively, and are formed so as to pass through the rear end portion and the protruding wall portion 31D. Additionally, the hole bottom side of the first and second insertion holes 40A to 40C and 41A and 41B are reduced in diameter so that the back surfaces of the heads of the fixing screws 42 which will be described later come into contact with the hole bottoms. Additionally, in a state where the head member 30 is seated on the mounting portion 16 as described above, the first insertion holes 40A to 40C are made obliquely and slightly eccentric towards the tip side and upside of the holder 10 so as to be separated from the third receiving surface 19 and approach the second receiving surface 18 with respect to the centers of the first fixing screw holes 20A to 20C. Moreover, the centers of the second insertion holes 41A and 41B are made obliquely and slightly eccentric towards the one side surface 13A and the upside so as to be separated from the lower surface 12 of the holder 10 and approach the first receiving surface 17 with respect to the centers of the second fixing screw holes 21A and 21B.

Figure 14:
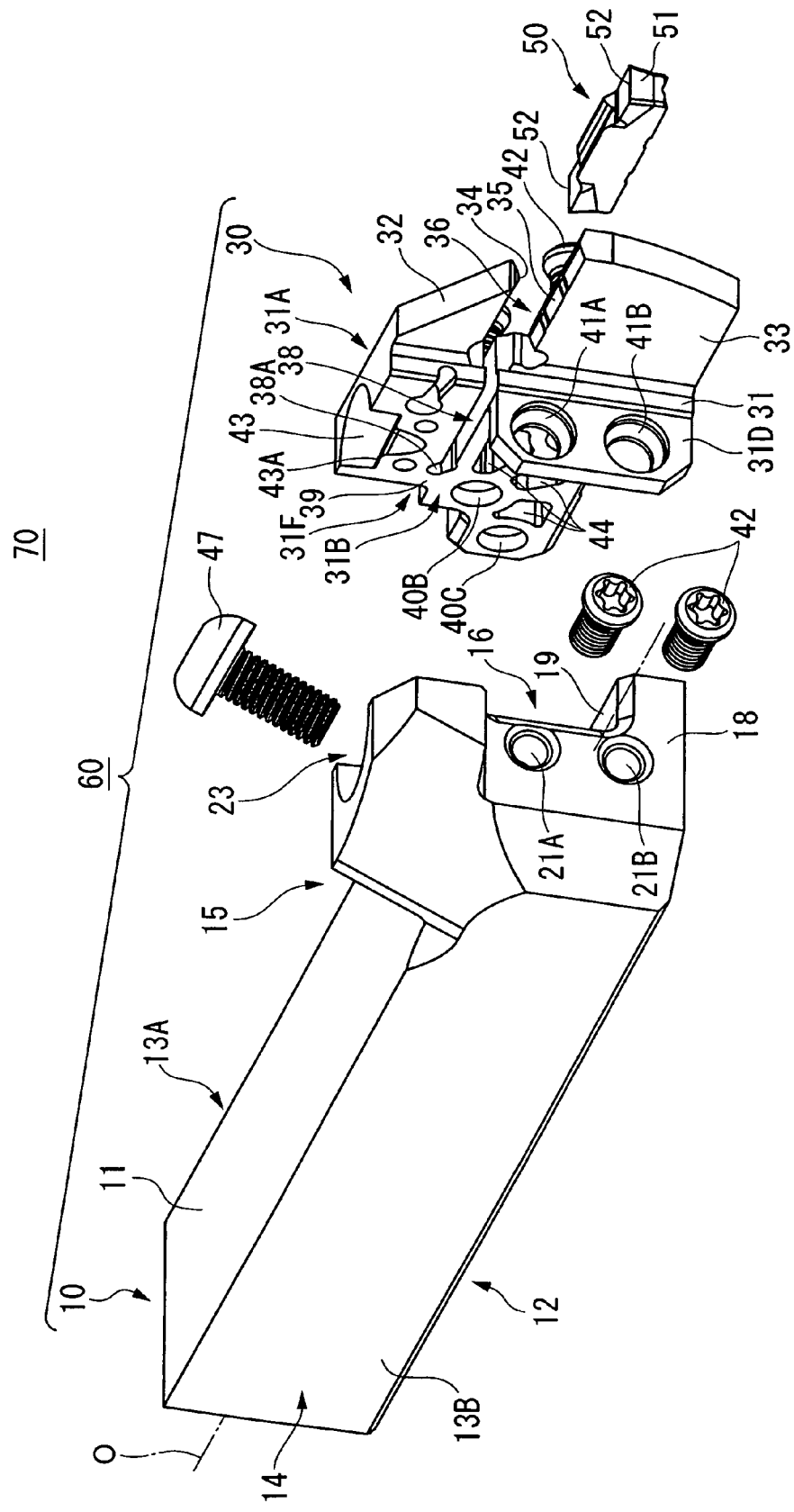
FIG. 14 is an exploded perspective view when the embodiment shown in FIG. 13 is seen from the upside of the tip and the other side surface of the holder.
Figure 15:
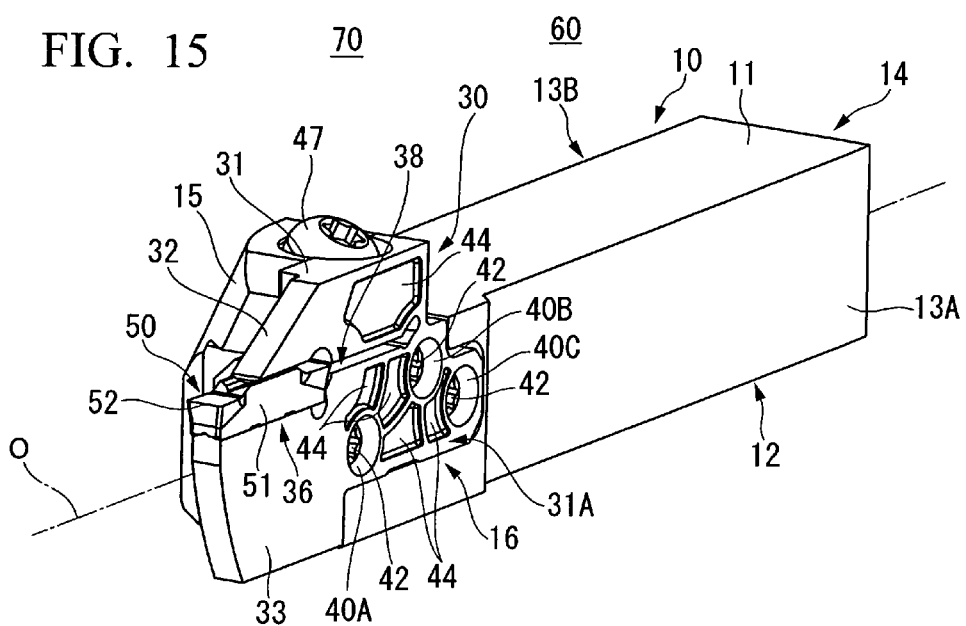
FIG. 15 is a perspective view of assembly when the embodiment shown in FIG. 13 on which the head member and a cutting insert are mounted is seen from the upside of the tip and the one side surface.
Figure 16:
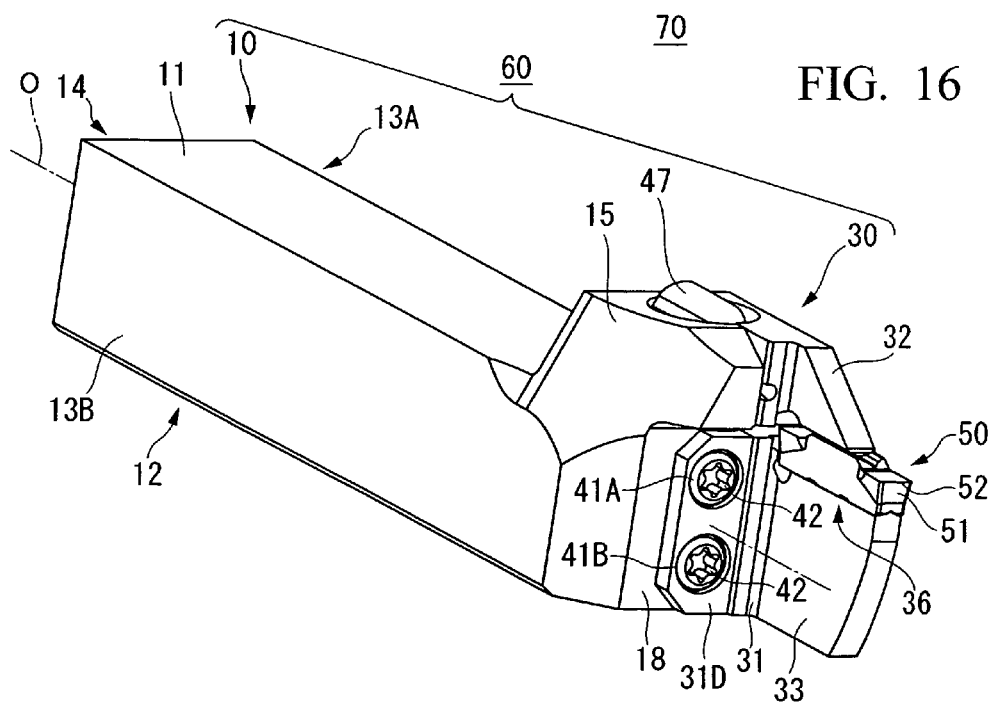
FIG. 16 is a perspective view of assembly when the embodiment shown in the FIG. 13 on which the head member and the cutting insert are mounted is seen from the upside of the tip and the other side surface.

Accordingly, in such a seated state, inserting the fixing screws 42 through the first and second insertion holes 40A to 40C and 41A and 41B as shown in FIGS. 13 and 14, and screwing the fixing screws into the first and second fixing screw holes 20A to 20C and 21A and 21B as shown in FIGS. 15 and 16. Thereby, the head member 30 is attached to the mounting portion 16 as the above attached state, as the other side surface 31B of the rear end portion of the head member body 31 is pressed against the first receiving surface 17, the back surface 31E of the protruding wall portion 31D is pressed against the second receiving surface 18, and the lower end surface 31C of the rear end portion is pressed against and fixed to the third receiving surface 19.

In addition, a rear end surface 31F of the head member body 31 is formed so as to be made perpendicular to the side surfaces 31A and 31B, and face the lower end surface 31C while assuming a stairway shape towards the rear end side as shown in FIG. 6 in side view which faces the one side surface 31A. Additionally, a rectangular convex portion formed by a stepped portion at the rearmost end in the stairway and the lower end surface 31C is housed in a U-shaped portion, which is opened towards the tip side, on the rear end side of the mounting portion 16, and the convex portion is formed with the first insertion hole 40C at the rearmost end in the first insertion holes 40A to 40C. In this regard, the rear end surface 31F is spaced from the wall surface of the mounting portion 16 which faces the tip side in the attached state so as not contact the wall surface. Additionally, the first insertion hole 40A at the foremost end is opened to the vicinity of the back surface 31E of the protruding wall portion 31D, and opened at the position nearest to the lower end surface 31C among the three insertion holes 40A to 40C.

Moreover, the first insertion hole 40B which is located between the first insertion holes 40A and 40C, and is located closest to the upper jaw portion 32 in the three first insertion holes 40A to 40C is formed inside stepped portion located upper and further in fore-end side in one step than the convex portion in the side view. In this case, the distance from the first insertion hole 40A at the foremost end is made greater than the distance from the first insertion hole 40C at the rearmost end. Additionally, in this side view, the opening of the first insertion hole 40B on the side of the one side surface 31A is arranged so that the upper edge thereof touches or intersects an extension line of a lower surface of the slit 38.

A rear end portion of the slit 38 is formed as a bent portion 38A which is bent so as to extend towards the upper jaw portion 32 on the upside as it moves towards the rear end side as shown in FIG. 6, and the bent portion 38A is formed at a distance from the opening of the first insertion hole 40B so as to have a circular-arc shape which is coaxial with the first insertion hole 40B which is located in proximity with the rear end side of the slit 38. Accordingly, in the present embodiment, the portion between a wall surface 38B of the rear end of the bent portion 38A which faces the tip side, and the rear end surface 31F of the head member body 31 is formed as the connecting portion 39.

Here, the connecting portion 39 is located right above the first insertion hole 40B in the vicinity for an upper front corner portion of a stepped portion in which the first insertion hole 40B is formed. In the present embodiment, the connecting portion 39 is arranged on the extension line to the rear end side of the pressing surface 34 of the upper jaw portion 32, or at a position slightly higher than the extension line. In addition, the width of the bent portion 38A in the radial direction of the circular arc is made slightly greater than the width of the slit 38 which extends parallel to the axis O.

Figure 12:
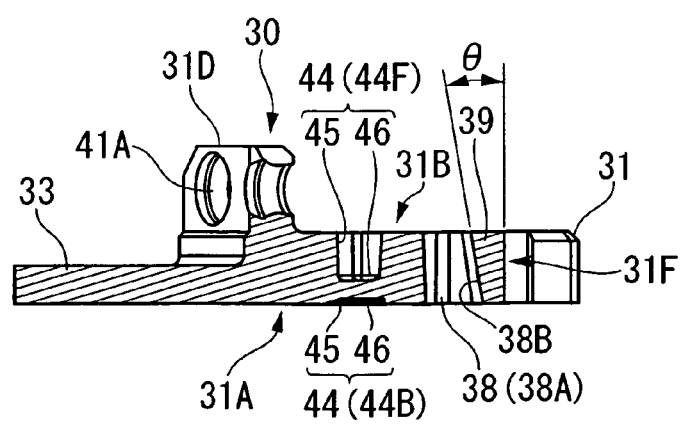
FIG. 12 is a sectional view taken along an A-A line in FIG. 6.

Moreover, the wall surface 38B of the rear end of the bent portion 38A of the slit 38 which faces the tip side is formed as a concave curve, such as a circular arc in cross-section, in the present embodiment, and as shown in FIG. 12, is inclined towards the tip side as it moves from the one side surface 31A of the head member body 31 towards the other side surface 31B thereof. Thereby, the connecting portion 39 formed between the rear end surface 31F made perpendicular to the side surfaces 31A and 31B is formed so as to become gradually thicker towards the other side surface 31B from one side surface 31A.

A countersunk portion 43 which is opened to the upper surface of the upper jaw portion and the other side surface 31B is formed closer to the tip side than the connecting portion 39 in the upper jaw portion 32. The countersunk portion 43 communicates with the recess 23 which is opened to the upper surface of the protruding portion 15 of the holder 10 in the attached state, and inclines so as to have a circular cross-sectional shape about the centerline of the clamp screw hole 22. Moreover, a bottom surface 43A of the countersunk portion 43, as shown in FIG. 7, is formed in a circular-arc shape, is inclined at an acute angle with respect to the other side surface 31B so as to retreat gradually downward as it moves towards the one side surface 31A of the head member body 31 and the rear end side, and is arranged so as to protrude further than a stepped surface 24 of the recesses 23 by one step towards the direction of the centerline of the clamp screw hole 22 in the attached state.

Moreover, in the head member 30 of the present embodiment, the side surfaces 31A and 31B of the head member body 31 are formed with recesses 44 which are recessed from the side surfaces 31A and 31B which are made planar in top and bottom views as described above. The recess 44, as shown in, for example, FIG. 12, is formed so as to have an inner wall surface 45 which intersects the side surfaces 31A and 31B at an angle, and is continuous around the inner periphery of the recess 44, and a bottom surface 46 which is connected to the inner wall surface 45 while intersecting the inner walls surface 45 at an angle over its whole periphery, and is parallel to the side surfaces 31A and 31B. Additionally, the recess 44 is formed so as not to pass through the head member body 31 and so as not to be opened to the tip surface, rear end surface 31F, upper surface, and lower end surface 31C of the head member body 31, the slit 38, and the first insertion holes 40A to 40C, and is formed so that the recesses 44 also do not communicate with each other.

Here, the head member body 31 is formed with a plurality of recesses 44. That is, both of the side surface 31A which faces the front side (the one side surface 13A of the holder 10) in the attached state, and the other side surface 31B which faces the back side (the first receiving surface 17 of the mounting portion 16) are respectively formed with a plurality of the recesses 44. In this regard, in the front and back side surfaces 31A and 31B, the recess 44 is formed only at the rear end portion which is thicker by one step in the present embodiment, and is not formed in the tip portion and protruding wall portion 31D in which the upper and lower jaw portions 32 and 33 are formed.

Among the surfaces, as shown in FIG. 6, the one side surface 31A on the front side is formed with five recesses 44A to 44E, and the first recess 44A that is some (one in the present embodiment) of the recesses is formed on the side of the upper jaw portion 32 above the slit 38. The inner wall surface 45 of the recess 44A extends so as to leave a substantially constant distance between the slit 38 including the bent portion 38A, the upper surface of the head member body 31, and the rear end surface 31F. And when seen from the side, in the tip side, the upper portion thereof inclines straight towards the downside and the tip side, and the lower portion thereof is connected to the tip of the upper portion and inclines and retreats while being bent in a convex shape towards the downside with respect to the rear end side, and surrounds the periphery of the recess 44A.

Additionally, among the second to fifth recesses 44B to 44E formed on the side of the lower jaw portion 33 below the slit 38, the second recess 44B on the tip side is formed between the first insertion hole 40A and the slit 38, the third recess 44C on the upper side and the fourth recess 44D on the lower side are formed between the first and second insertion holes 40A and 40B, and the fifth recess 44E is formed on the tip side of the third insertion hole 40C on the lower side of the second insertion hole 40B. In the second to fifth recesses 44B to 44E, a substantially constant distance is also left between the slit 38 or the openings of the first to third insertion holes 40A to 40C and the lower end surface 31C. Additionally, the distance between the adjacent recesses 44B to 44E is slightly greater than this distance, and is also set to a constant distance.

In addition, the portions between the adjacent recesses 44B to 44E are formed so that the portion between the second and third recesses 44B and 44C and the portion between the third and fourth recesses 44C and 44D radially extend from the first insertion hole 40A, and similarly, the portion between the third and fourth recesses 44C and 44D, and the portion between the fourth and fifth recesses 44D and 44E extend radially from the second insertion hole 40B. In this regard, while the respective portions between the second to fourth recesses 44B to 44D are bent in a slightly convex shape towards the downside of the rear end of the holder 10 in the attached state, the portion between the fourth and fifth recesses 44D and 44E is bent in a slightly convex shape towards the tip side. Additionally, the inner wall surface 45 on the tip side of the second recess 44B extends so as to incline and retreat while being bent in a convex shape with respect to the rear end side towards the upside so as to run along a convexly bent extension line formed by the lower portion on the tip side of the first recess 44A.

As shown in FIG. 9, on the lower side (the upper side in FIG. 9) than the slit 38 of the other side surface 31B on the back side, three recesses 44F to 44H including an upper sixth recess 44F and a lower seventh recess 44G between the first and second insertion holes 40A and 40B, and an eighth recess 44H on the tip side of the third insertion hole 40C on the lower side of the second insertion hole 40B are also formed at a substantially constant distance between the slit 38 or the openings of the first to third insertion holes 40A to 40C and the lower end surfaces 31C. Additionally, the portion between the adjacent sixth and seventh recesses 44F and 44G radially extends from the first insertion hole 40A, and the portion between the sixth and seventh recesses 44F and 44G and the portion between the seventh and eighth recesses 44G and 44H radially extend from the second insertion hole 40B.

In this regard, the portion between the sixth and seventh recesses 44F and 44G extends straight with a constant width so as to connect the first and second insertion holes 40A and 40B linearly, and the portion between the seventh and eighth recesses 44G and 44H is formed so that the inner wall surface 45 of the seventh recess 44G inclines towards the tip side as it moves towards the lower end surface 31C from the second insertion hole 40B, and the width thereof becomes gradually wider. In this way, in the present embodiment, the recesses 44 are formed in the front and back side surfaces 31A and 31B so that the shapes or numbers thereof become different from each other. In particular, all the recesses 44 have different shapes in the side surface 31A and 31B without coinciding with each other as seen from a direction which faces the side surfaces 31A or 31B.

Moreover, in the present embodiment, the depths of the plurality of recesses 44 from the side surfaces 31A or 31B, or the depths from the side surfaces 31A or 31B to the bottom surfaces 46 of the recesses 44 are different from each other. Specifically, as shown in FIG. 12, the depths from the side surfaces 31A of the first to fifth recesses 44A to 44E, which are formed in the one side surface 31A in the front side, are significantly smaller than the depths from the side surface 31B of the sixth to eighth recesses 44F to 44H, which are formed in the other side surface 31B in the backside. Additionally, the depths of the recesses 44A to 44E and the recesses 44F to 44H on the side of the respective side surfaces 31A and 31B are made equal to each other. Thereby, the portion between the bottom surfaces 46 of the recesses 44A to 44E and the bottom surfaces 46 of the recesses 44F to 44H in both the side surfaces 31A and 31B, as shown in FIG. 12, are formed so as to be arranged substantially in the middle in its thickness direction of the thin-walled lower jaw portion 33 of the tip portion of the head member body 31.

In addition, the head member 30 including such recesses 44 may be manufactured so that the recesses 44 are formed by an end mill after the head member body 31 in which the recesses 44 are not formed is shaved and shaped from a steel material. However, for example, the head member 30 may be manufactured by a MIM (Metal Injection Molding) method. In the method, injection-molding a material, which is given fluidity by kneading base fine powder of a steel material, which becomes the head member body 31, and a binder, such as resin, into a split die where the shape of the head member body 31 is reversed. After that, removing the binder by heating to sinter the base fine powder. In a case where the head member is manufactured by the MIM method, a draft angle which inclines to the outside as it moves towards the side surfaces 31A and 31B from the bottom surfaces 46 is given to the inner wall surfaces 45 of the recesses 44.

Additionally, even in cases where the head member is manufactured by the MIM method, or is manufactured by shaving, it is desirable that the manufactured head member body 31 be subjected to the shot peening which ejects hard pellet particles onto the surface of the head member body, thereby promoting surface hardening.

The cutting insert 50 for grooving and cutting-off attached to the insert attachment seat 36 of such a head member 30 includes an insert body 51 the profile of which is formed in the shape of a square bar by a hard material, such as cemented carbide, having a substantially rectangular cross-section. Additionally, portions which have a concave V-shaped cross-section are formed at the lower surface and the central portions of upper surface of the insert body 51. These surfaces are enabled to come into contact with the pressing surface 34 and the pedestal surface 35 which have a convex V-shaped cross-section so as to coincide bisectors of the V-shaped form of the surfaces. Additionally, cutting faces are respectively formed at positions which have retreated by one step from the central portions, at both ends of the upper surface, and cutting blades 52 used for grooving or cutting-off are formed at both end edges of the cutting faces.

With respect to the head member 30 in the attached state, such a cutting insert 50 is inserted into the insert attachment seat 36 from the tip side so that one cutting blade 52 thereof faces the tip side, and the concave V-shaped lower surface and the central portion of upper surface are made to face the pedestal surface 35 and the pressing surface 34, and is positioned in the direction of the axis O where the end surface of the insert body 51 which faces the rear end side comes into contact with the contacting surface 37.

Moreover, as shown in FIGS. 13 and 14, the clamp screw 47 is screwed into the clamp screw hole 22 bored in the protruding portion 15 of the holder 10, whereby the head of the clamp screw 47 comes into contact with the bottom surface 43A of the countersunk portion 43 of the head member body 31, and the clamp screw 47 engages the upper jaw portion 32. Next, the upper jaw portion 32 is pressed in the direction in which the clamp screw hole 22 is bored, and is elastically deformed so as to deflect towards the lower jaw portion 33 with the connecting portion 39 as a fulcrum. As a result, the cutting tool with detachable insert 70 of the present embodiment is constructed such that the pressing surface 34 of the upper jaw portion 32 presses the insert body 51 towards the pedestal surface 35, and thereby the cutting insert 50 is clamped.

In the head member 30 of the cutting tool with detachable insert 70 constructed in this way, the recesses 44 are formed in the side surfaces 31A and 31B, and each recess 44 has the continuous inner wall surface 45 therearound, and the bottom surface 46 which is connected to the inner wall surface 45 over its whole periphery. Therefore, between the recess 44 and the upper surface, the rear end surface 31F, or the lower end surface 31C of the head member body 31, at least two rib-like portions which rise and protrude with respect to the bottom surface 46 of the recess 44 are formed on both sides of the recess 44 across the recess 44. In particular, in the present embodiment, the side surfaces 31A and 31B are formed with a plurality of recesses 44A to 44H. Thus, such rib-like portions are also formed between the inner wall surfaces 45 of the adjacent recesses 44B to 44E.

Accordingly, vibration which is generated in the insert body 51 from the cutting blades 52 facing the tip side of the cutting insert 50 during the above-described grooving or cutting-off is dispersed via such a plurality of rib-like portions when propagating to the holder 10 from the head member 30, and thus the vibration does not propagate directly to the holder 10. Therefore, occurrence of chatter vibration in the holder 10 can be prevented. Additionally, since the weight reduction of the head member body 31 can be achieved by the recess 44, the vibration itself is easy to attenuate and it is possible to suppress generation of chatter vibration by this as well.

For this reason, according to the cutting tool with detachable insert 70 mounted with the head member 30 of the above construction, even if the amount of protrusion of the cutting blades 52 is increased during grooving or cutting-off, it is possible to prevent occurrence of a situation where cutting operation is hindered and deterioration of machining accuracy is caused, due to such chatter vibration. As a result, it is possible to perform high-precision and high-quality cutting operation stably and smoothly. Additionally, since the surface area of the head member body 31 is increased by forming the recess 44 in this way, the cutting heat generated in the cutting insert 50 during cutting can also be rapidly radiated via the head member 30. As a result, even in dry cutting, it is possible to prevent thermal damage from occurring in the cutting insert 50, or to prevent temperature adhesion of chips from occurring in the cutting insert 50.

On the other hand, even if the wall thickness of the head member body 31 is reduced by forming such a recess 44, the recess 44 in the head member 30 of the above construction does not pass through the head member body 31 unlike the first and second insertion holes 40A to 40C and 41A and 41B. Additionally, the recess 44 is not opened to a peripheral end surface (the tip surface, the rear end surface 31F, the upper surface, or the lower end surface 31C) located between the side surfaces 31A and 31B of the head member body 31, unlike the insert attachment seat 36, the slit 38, or the countersunk portion 43, and the above-described rib-like portions are formed around the recess 44. Therefore, the strength or rigidity of the head member body 31 is not significantly impaired. Especially, by performing shot peening on the head member body 31 as described above, it is possible to improve the strength or rigidity of the head member 30 more reliably to achieve more stabilized cutting.

However, even if the rib-like portions are formed or the shot peening is performed in this way, when the total volume of the recesses 44 becomes excessively large, degradation of the strength or rigidity of the head member body 31 cannot be avoided. On the other hand, the above-described effects including vibration prevention and cutting-heat radiation become insufficient if the total volume of the recesses 44 is too small. Therefore, it is desirable that the total volume of the recesses 44 be set to a range of 2% to 15% of the volume of the head member body 31 in which the recesses 44 are not formed. In addition, although the bottom surface 46 parallel to the side surfaces 31A and 31B in which each recess 44 intersects the inner wall surface 45 at an angle is provided in the present embodiment, for example, the recess may formed as a concave spherical shape which has a concave curve where the inner wall surfaces 45 and the bottom surface 46 are smoothly continuous.

Additionally, in the present embodiment, as described above, the front and back side surfaces 31A and 31B that are the one side surface 31A and the other side surface 31B of the head member body 31 are respectively formed with the recesses 44A to 44E and the recesses 44F to 44H, and the recesses 44 are formed in mutually different shapes in a projection view as seen from directions which face the side surfaces 31A and 31B, or as seen from the side of either of the side surfaces 31A and 31B. For this reason, since the rib-like portions formed around the recesses 44A to 44E and the recesses 44F to 44H are also formed in mutually different shapes, vibration can be more reliably dispersed, vibration can be mutually cancelled, and the propagation of vibration to the holder 10 can be more effectively suppressed.

Moreover, in the present embodiment, the depths of the recesses 44A to 44E and the recesses 44F to 44H, which are formed in the front and back side surfaces 31A and 31B, from the side surfaces 31A and 31B are different from each other, and thereby the heights of the rib-like portions are also different from each other on the front and back side surfaces. Therefore, dispersed vibration can be mutually cancelled more reliably. In addition, in the present embodiment, the depths between the recesses 44A to 44E of the one side surface 31A and between the recesses 44F to 44H of the other side surface 31B are made equal to each other. However, the recesses 44 which are different in depth from each other may be formed in at least one of the side surfaces 31A and 31B so long as the recesses 44 do not pass through the head member body 31.

In the present embodiment, when clamping the cutting insert 50, the clamp screw 47 is screwed into the clamp screw hole 22 bored in the protruding portion 15 of the tip portion of the holder 10 obliquely with respect to the first receiving surface 17. And, as the head of the clamp screw 47 presses the inclined bottom surface 43A of the countersunk portion 43 of the head member body 31, the upper jaw portion 32 is made to elastically deform with the connecting portion 39 as a fulcrum. For this reason, the upper jaw portion 32 receives a pressing force so that the pressing surface 34 thereof is deflected to the pedestal surface 35, and also receives a pressing force in a direction in which the upper jaw portion 32 inclines towards the other side surface 13B of the holder 10 about the connecting portion 39, when seen from the tip side.

However, the first receiving surface 17 of the mounting portion 16 is arranged on the side towards which the upper jaw portion 32 inclines in this way, and is brought into close contact with the other side surface 31B of the head member body 31 in the upper jaw portion 32. As a result, the upper jaw portion 32 is prevented from actually inclining. Moreover, in the present embodiment, the wall surface 38B of the rear end of the bent portion 38A of the slit 38 which faces the tip side is slightly inclined towards the tip side as it moves from the one side surface 31A of the head member body 31 towards the other side surface 31B thereof. Thereby, the connecting portion 39 between the rear end surface 31F perpendicular to the side surfaces 31A and 31B, and the slit 38 is formed so as to become gradually thicker from one side surface 31A towards the other side surface 31B located on the side toward which the upper jaw portion 32 inclines.

Accordingly, even if the force acting towards the other side surface 13B of the holder 10 is received as described above, a situation where the upper jaw portion 32 inclines and presses the cutting insert 50 can be prevented. For example, as in the present embodiment, in the case where the pressing surface 34 and the pedestal surface 35 are formed in a convex V-shaped cross-section, and lower surface and the central portions of the upper surface of the insert body 51 are formed in the shape of a concave V-shaped cross-section, the cutting insert 50 can be pressed and clamped in a state where bisectors of the V-shapes are exactly coincide with each other.

For this reason, the cutting insert 50 can be reliably and firmly clamped, and the situation where clattering occurs in the insert body 51 due to cutting load, and machining accuracy is reduced can also be prevented.

In addition, in the present embodiment, as described above, the rear end surface 31F of the head member body 31 is perpendicular to the side surfaces 31A and 31B, and the wall surface 38B of the bent portion 38A of the rear end of the slit 38 is inclined so that the connecting portion 39 becomes gradually thicker towards the side where the upper jaw portion 32 falls down. However, contrary to this, the wall surface 38B may be made perpendicular to the side surfaces 31A and 31B, and the rear end surface 31F may incline towards the rear end side as it moves towards the side surface 31B from the side surface 31A, or both of the rear wall surface 38B and the rear end surface 31F may be inclined so as to be separated from each other as it moves towards the side surface 31B from the side surface 31A.

However, in a case where the wall surface 38B is inclined with respect to the rear end surface 31F in this way, thereby making the wall thickness of the connecting portion 39 gradually larger towards the other side surface 31B of the head member body 31, or towards the side where a pressing force acts on the upper jaw portion 32 by the clamp screw 47, if the inclination angle θ shown in FIG. 12 is too large, there is a possibility that deflection of the upper jaw portion 32 itself so that the pressing surface 34 approaches the pedestal surface 35 become difficult, though also depending on the width of the connecting portion 39 between the wall surface 38B and the rear end surface 31F. On the other hand, if this inclination angle θ is too small, the above-described effects are not reliably exhibited. Thus, it is desirable that this inclination angle θ be set to 5° to 15°, in a cross-section orthogonal to the wall surface 38 through the middle of the slit width of the wall surface 38 as shown in FIG. 12.

Additionally, in the present embodiment, the slit 38 in which such a wall surface 38B is formed has the bent portion 38A which is bent so as to extend parallel to the axis O from the rear end of the insert attachment seat 36, or extend parallel to the pressing surface 34 and pedestal surface 35 of the insert attachment seat 36, and then extend towards the upper jaw portion 32. Thereby, even if the insertion hole (the first insertion hole 40B) through which a fixing screw 42 which fixes the head member body 31 is inserted is formed on the extension line of the slit 38, the connecting portion 39 which becomes a fulcrum of deflection of the upper jaw portion 32 can be arranged on the rear end side which is further separated from the insert attachment seat 36. For this reason, by making the inclination of the pressing surface 34 caused by the deflection of the upper jaw portion 32 as small as possible, the pressing surface 34 can be reliably brought into close contact with and pressed against the central portion of the upper surface of the insert body 51, and compactification of the head member body 31 can be secured.

Moreover, the bent portion 38A is formed at a distance from the opening of the first insertion hole 40B on the side of the side surface 31A so as to have a circular-arc shape which is coaxial with the first insertion hole 40B. For this reason, according to the present embodiment, the wall thickness of the circular-arc portion between the bent portion 38A and the first insertion hole 40B can be uniformly secured, and occurrence of damage can be prevented in the circular-arc portion due to the fastening force of the fixing screw 42 inserted through the first insertion hole 40B.

In addition, when the length of the bent portion 38A along the peripheral direction of the first insertion hole 40B is too short, the position of the connecting portion 39 cannot be arranged on the rear end side. On the other hand, the length of the bent portion along the peripheral direction is too long, the circular-arc portion between the bent portion and the first insertion hole 40B also becomes too long, and damage may be caused even if uniform wall thickness is somehow secured. For this reason, it is desirable that the bent portion 38A have a length such that the connecting portion 39 is formed right above the first insertion hole 40B as in the present embodiment.

INDUSTRIAL APPLICABILITY

According to the present invention, it is possible to provide a head member for a cutting tool with detachable insert capable of suppressing generation of chatter vibration even if the amount of protrusion from a portion mounted on a holder to a portion formed with an insert attachment seat is increased, and capable of efficiently radiating the cutting heat of a cutting insert, a tool body in which the head member is mounted on a tip portion of a holder, and a cutting tool with detachable insert in which the insert is clamped by the head member attached to the tip portion of the holder.

The invention claimed is:

1. A head member for a cutting tool with detachable insert comprising a head member body formed with an insert attachment seat to which a cutting insert having cutting blades is detachably attached, and constituting the cutting tool with detachable insert by being mounted to a tip portion of a holder,
    wherein a side surface of the head member body is formed with a recess which has a continuous inner wall surface therearound and a bottom surface connected to the inner wall surface over its whole periphery and which is recessed from the side surface without passing though the head member body.

2. The head member for a cutting tool with detachable insert according to claim 1,
    wherein the head member body has the side surfaces mutually facing opposite sides at the front and back thereof, and the recesess are respectively formed in each side face in mutually different shapes when seen from directions facing the each side surface.

3. The head member for a cutting tool with detachable insert according to claim 1,
    wherein the head member body is formed with a plurality of the recesses with different depths from the side surface.

4. The head member for a cutting tool with detachable insert according to claim 1,
    wherein the volume of the recess is set to a range of 2% to 15% of the volume of the head member body in which the recess is not formed.

5. The head member for a cutting tool with detachable insert according to claim 1,
    wherein shot peening is performed on the head member body.

6. A tool body for a cutting tool with detachable insert comprising the head member for a cutting tool with detachable insert according to claim 1, and a holder which has the head member attached to a tip portion thereof.

7. A cutting tool with detachable insert comprising the head member for a cutting tool with detachable insert according to claim 1, a holder which has the head member attached to a tip portion thereof, and an insert clamped by the head member.

8. A tool body for a cutting tool with detachable insert comprising the head member for a cutting tool with detachable insert according to claim 2, and a holder which has the head member attached to a tip portion thereof.

9. A tool body for a cutting tool with detachable insert comprising the head member for a cutting tool with detachable insert according to claim 3, and a holder which has the head member attached to a tip portion thereof.

10. A tool body for a cutting tool with detachable insert comprising the head member for a cutting tool with detachable insert according to claim 4, and a holder which has the head member attached to a tip portion thereof.

11. A tool body for a cutting tool with detachable insert comprising the head member for a cutting tool with detachable insert according to claim 5, and a holder which has the head member attached to a tip portion thereof.

12. A cutting tool with detachable insert comprising the head member for a cutting tool with detachable insert according to claim 2, a holder which has the head member attached to a tip portion thereof, and an insert clamped by the head member.

13. A cutting tool with detachable insert comprising the head member for a cutting tool with detachable insert according to claim 3, a holder which has the head member attached to a tip portion thereof, and an insert clamped by the head member.

14. A cutting tool with detachable insert comprising the head member for a cutting tool with detachable insert according to claim 4, a holder which has the head member attached to a tip portion thereof, and an insert clamped by the head member.

15. A cutting tool with detachable insert comprising the head member for a cutting tool with detachable insert according to claim 5, a holder which has the head member attached to a tip portion thereof, and an insert clamped by the head member.

\* \* \* \* \*